United States Patent
Lightle et al.

[19]

[11] Patent Number: 6,153,128
[45] Date of Patent: Nov. 28, 2000

[54] RETROREFLECTIVE ARTICLE AND METHOD OF MAKING SAME

[75] Inventors: Vera L. Lightle, Hudson, Wis.; Britton G. Billingsley, St. Paul, Minn.

[73] Assignee: 3M Innovative Properties Company, St. Paul, Minn.

[21] Appl. No.: 09/140,083

[22] Filed: Aug. 25, 1998

Related U.S. Application Data

[62] Division of application No. 08/587,339, Jan. 16, 1996, which is a continuation of application No. 08/241,508, May 12, 1994, abandoned.

[51] Int. Cl.[7] .................................................. B29D 11/00
[52] U.S. Cl. ........................ 264/1.9; 264/83; 264/160; 264/173.16; 427/163.4
[58] Field of Search ................. 264/1.7, 1.9, 173.16, 264/1.36, 157, 160, 81, 82, 83; 428/323, 913; 427/163.1, 163.4

[56] References Cited

U.S. PATENT DOCUMENTS

| | | |
|---|---|---|
| 3,700,305 | 10/1972 | Bingham . |
| 3,702,213 | 11/1972 | Schwab ..................................... 264/1.9 |
| 3,801,183 | 4/1974 | Sevelin et al. . |
| 3,989,775 | 11/1976 | Jack et al. ................................ 264/1.9 |
| 4,082,426 | 4/1978 | Brown . |
| 4,099,838 | 7/1978 | Cook et al. . |
| 4,102,562 | 7/1978 | Harper et al. . |
| 4,153,412 | 5/1979 | Bailey . |
| 4,200,875 | 4/1980 | Galanos . |
| 4,533,592 | 8/1985 | Bingham . |
| 4,634,220 | 1/1987 | Hockert et al. . |
| 4,645,301 | 2/1987 | Orensteen et al. . |
| 4,650,283 | 3/1987 | Orensteen et al. . |
| 4,688,894 | 8/1987 | Hockert . |
| 4,691,993 | 9/1987 | Porter et al. . |
| 4,708,920 | 11/1987 | Orensteen et al. . |
| 4,714,656 | 12/1987 | Bradshaw et al. . |
| 4,763,985 | 8/1988 | Bingham . |
| 4,801,193 | 1/1989 | Martin . |
| 4,968,063 | 11/1990 | McConville et al. . |
| 4,983,436 | 1/1991 | Bailey et al. . |
| 5,060,981 | 10/1991 | Fossum et al. . |
| 5,085,918 | 2/1992 | Rajan et al. . |
| 5,128,804 | 7/1992 | Lightle . |
| 5,200,262 | 4/1993 | Li . |
| 5,264,063 | 11/1993 | Martin . |
| 5,283,101 | 2/1994 | Li . |
| 5,344,705 | 9/1994 | Olsen . |
| 5,549,774 | 8/1996 | Miekka et al. ........................... 156/277 |
| 5,620,613 | 4/1997 | Olsen . |
| 5,738,746 | 4/1998 | Billingsley et al. ............... 156/244.11 |

FOREIGN PATENT DOCUMENTS

| | | |
|---|---|---|
| 90/2573 | 4/1992 | Denmark . |
| 0 175 513 | 3/1986 | European Pat. Off. . |
| 0 255 251 A3 | 2/1988 | European Pat. Off. . |
| 0 389 114 A1 | 9/1990 | European Pat. Off. . |
| WO 93/23251 | 11/1983 | WIPO . |
| WO 92/07990 | 5/1992 | WIPO . |

OTHER PUBLICATIONS

Patent Abstracts of Japan, vol. 9, No. 199 (P–308) [1922] Aug. 16, 1985 & JP, A, 60 064302 (Yunichika Supaakuraito K.K.) Apr. 12, 1985, see abstract.

*Primary Examiner*—Mathieu D. Vargot
*Attorney, Agent, or Firm*—Karl G. Hanson

[57] ABSTRACT

A retroreflective article has first and second segments each comprising a binder layer and a multitude of microspheres partially embedded in the front surface of the binder layer. The first segment also has an opaque reflective metal layer disposed on the embedded portions of the microspheres; whereas, the second segment lacks such an opaque reflective metal layer and thereby allows the color of the underlying binder layer to be seen from the front side of the retroreflective article. The first and second segments display noticeably different colors under daytime lighting conditions, and each possesses a distinctly different retroreflective efficiency when viewed under retroreflective lighting conditions. The first and second segments therefore stand out in contrast to each other to enhance the conspicuity of the retroreflective article.

12 Claims, 4 Drawing Sheets

RETROREFLECTIVE ARTICLE AND METHOD OF MAKING SAME

This is a division of application No. 08/587,339 filed Jan. 16, 1996 which is a continuation of application No. 08/241,508 filed May 12, 1994 (now abandoned).

TECHNICAL FIELD

The present invention pertains to (i) an article that displays a retroreflective image bounded by a highly visible colored segment, (ii) a method of making an article that has two distinct retroreflective segments, and (iii) an article of clothing having a retroreflective article secured to the outer surface thereof.

BACKGROUND OF THE INVENTION

Retroreflective articles have the ability to return a substantial portion of incident light in the direction from which the light originated. This unique ability has lead to the widespread use of retroreflective articles on clothing worn by highway construction and maintenance workers and fire-fighters. The retroreflective articles displayed on their clothing typically are in the form of retroreflective stripes on a fluorescent background. The retroreflective articles improve the wearers' safety by highlighting their presence. This is accomplished by providing enhanced conspicuity to the garment under both daytime and nighttime lighting conditions. In daytime lighting conditions (strong diffuse ambient light), the fluorescent portion of the article provides the enhanced conspicuity by absorbing non-visible light and retransmitting that light in the visible spectrum. In nighttime lighting conditions (low diffuse ambient light), the retroreflective stripes provide the enhanced conspicuity by becoming illuminated when light from motor vehicle headlamps and search lights strikes the retroreflective articles.

The retroreflective, fluorescent-colored articles have been made by coating a layer of fluorescent material comprising a fluorescent pigment in an organic binder onto a fabric substrate, and then laminating or otherwise bonding a retroreflective material of the desired configuration to selected areas of the surface of the fluorescent-colored fabric. In many cases, the back surface of the fabric substrate (opposite the fluorescent surface having the retroreflective materials attached thereto) is then sewn, laminated or otherwise attached to selected areas of the garment that is worn by the highway worker or fire fighter. An example of this type of product is disclosed in U.S. Pat. No. 4,533,592 to Bingham. A detailed cross-section of a prior art retroreflective article that can be secured to the outer surfaces of a garment is shown in detail in FIG. 1.

Figure 1:
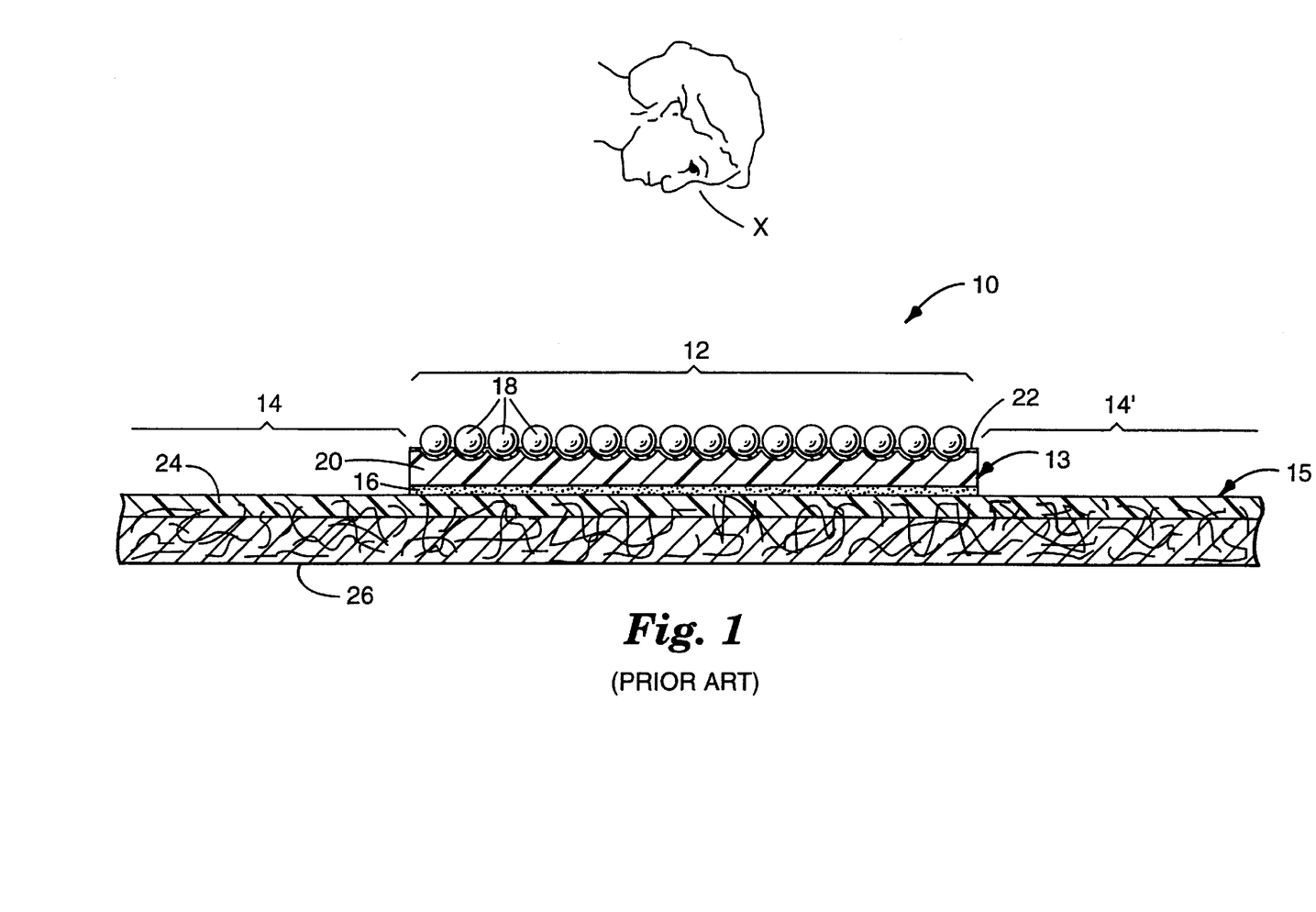
FIG. 1 is a cross-section of a prior art retroreflective article 10.

Retroreflective article 10 illustrated in FIG. 1 includes a retroreflective segment 12 bounded by two colored segments 14 and 14'. Retroreflective segment 12 includes a multitude of optical elements, typically microspheres 18 partially embedded in a binder layer 20. A specularly-reflective metal layer 22 is disposed behind the embedded portions of the microspheres 18. Retroreflective segment 12 may extend over the surface of a colored fabric 15 as a stripe. Colored fabric 15 typically includes a fluorescent-colored coating 24 on a fabric 26. When viewed from location X under strong diffuse ambient light, product 10 is seen as a grayish stripe (segment 12) bounded on both sides by a fluorescent-colored fabric noted as colored segments 14 and 14'. Under nighttime viewing conditions, the retroreflective stripe essentially is the only portion of article 10 that is highly visible when light is shined thereon.

Although product 10 can provide excellent conspicuity by highlighting a wearer's presence under both strong and low ambient lighting conditions, the retroreflective product has four major drawbacks: (i) excess layers of material are used in the construction 10; (ii) the retroreflective segment 12 can become delaminated from the underlying colored fabric 15; (iii) solvent-based binders and adhesives are frequently employed in the manufacture of the retroreflective segments 12 and in their application to the colored substrate 15; and (iv) there is essentially no retroreflectivity in the colored segments 14, 14' of the articles. Delamination of the retroreflective segment 12 from article 10 causes the garment to lose its nighttime conspicuity. Excessive layers of material make the garments heavier and less flexible and can increase product cost. Use of solvent-based binders and adhesives is unfavorable because they often require expensive solvent-recovery equipment to avoid polluting the environment.

To provide retroreflective articles with portions having varying degrees of retroreflectivity to display an image or some kind of pattern on the front side of the retroreflective article, a vapor-coated, specularly-reflective metal layer has been placed behind the optical elements of the sheeting in selected areas. The selective placement of the vapor-coated, metal reflective layers has been accomplished in a few different ways. A commonly-used method involves vapor-coating a continuous, specularly-reflective metal over the whole back surface of the optical elements, placing a protective layer over the portions of vapor-coated metal, and using an etchant solution to remove the unprotected areas of metal. A method of this kind is disclosed in U.S. Pat. Nos. 5,264,063, 4,801,193, and U.S. patent application Ser. No. 08/181,619 filed Jan. 13, 1994. U.S. Pat. No. 4,645,301 discloses a distinctly different method of selectively placing a specularly reflective metal behind optical elements. The method disclosed in this patent involves use of a laser and selective chemical removal of a continuous vapor-deposited metal layer. Although the above methods can selectively place a vapor-coated, specularly-reflective metal behind the optical elements of a retroreflective sheeting, these methods are relatively complicated and involve use of a solvent that must be disposed of in an environmentally sound manner.

SUMMARY OF THE INVENTION

The present invention provides a new retroreflective article and a new method of making a retroreflective article. The new retroreflective article overcomes the above-mentioned drawbacks of known retroreflective articles, and the new method allows a vapor-deposited metal to be selectively applied to microspheres in a less complicated manner that averts environmental problems.

In brief summary, the retroreflective article of the invention comprises:

a) a colored binder layer having first and second major surfaces; and b) a layer of microspheres having a portion partially embedded in the first major surface of the colored binder layer;

the binder layer and the layer of microspheres being divided into first and second segments that exhibit substantially different degrees of retroreflectivity and that display noticeably different colors when viewed under daytime lighting conditions, the first segment being characterized by having a reflective metal layer disposed on the embedded portion of the microspheres, and the second segment being characterized by lacking a reflective metal layer located functionally behind the embedded portion of the layer of microspheres.

The method of making a retroreflective article of the invention comprises:

(a) supporting a layer of microspheres on a carrier;

(b) vapor coating a reflective metal layer selectively to the supported layer of microspheres such that a first portion of the layer of microspheres has the reflective metal layer coated functionally therebehind and a second portion does not;

(c) partially embedding the layer of microspheres in a first major surface of a binder layer; and (d) separating the carrier from the layer of microspheres such that the layer of microspheres remains partially embedded in the first major surface of the binder layer to form a retroreflective article having first and second segments, where the first segment has the vapor-coated reflective metal layer disposed functionally behind the embedded portion of the microspheres.

The article of clothing of the invention comprises the retroreflective article of the invention and a substrate to which the retroreflective article is secured. The substrate can form an outer portion of the article of clothing so that the retroreflective article can serve its safety function when the clothing is worn by a person.

The retroreflective article of this invention, which may be made in accordance with the new method of the invention, exhibits uniform surface characteristics and a distinct variation in retroreflective efficiency between two segments of the retroreflective article. The invention minimizes the number of layers in the article, provides a smooth, evenly-textured top surface, and also can allow a colored-segment of the article to be retroreflective. Using the method of the invention, a retroreflective article can be made having segments displaying varying degrees of retroreflectivity without having to use a chemical etchant or similar solvent that brings environmental concerns into play.

The present invention has first and second segments that are retroreflective, where the first segment has a reflective metal layer disposed on the embedded microspheres and the second segment lacks a reflective metal layer functionally behind the embedded portions of the microspheres. In reference to the position of the reflective metal layer, the language "disposed on the embedded portion of the layer of microspheres" means that the reflective metal layer is in direct contact with the microspheres (on the embedded portion) or is in contact with the microspheres through another reflective layer (for example, a dielectric mirror) or a thin, non-reflecting, colorless layer. If a non-reflecting colorless layer is disposed between the microspheres and the reflective metal layer, its thickness is not greater than 20 micrometers (this is what is meant by "thin"), preferably is less than 10 micrometers, and more preferably less than 5 micrometers. If the thin layer does not contribute significantly to the retroreflectivity of the article, it is considered to be non-reflecting; and if the thin layer is essentially clear, it is considered to be colorless. Non-reflecting colorless layers that are not thin and colorless can have a deleterious effect on the performance of the retroreflective sheeting.

The language "functionally behind" is used herein to mean having the reflective metal layer positioned on or behind the embedded portion of the microspheres such that the reflective metal layer is capable of reflecting incident light that passes through the microspheres. By having a reflective metal layer disposed on the microspheres in a first segment and by not having a reflective metal layer disposed functionally behind the microspheres in a second segment, the first and second segments are able to provide a different degree of retroreflectivity when viewed under retroreflective viewing conditions. What is meant by "substantially different degrees of retroreflectivity" is that all lighting conditions being essentially equal, the first and second major segments retroreflect noticeably different amounts of light. Unless the second major segment possesses a reflector behind the microspheres that performs better than the reflective metal layer, the first segment will have substantially better retroreflective efficiency; that is, it will retroreflect a significantly greater amount of incident light. Typically, the first major segment allows a high degree of retroreflectivity to be achieved. By "high degree" is meant the coefficient of retroreflection, $R_A$, exceeds 100 candelas per lux per square meter ($c/l/m^2$) when the retroreflective article is tested according to ASTM E 810-93b using a 0.2 degree observation angle and a −4 degree entrance angle. "ASTM E 810-93b" is a standard test for measuring retroreflectivity of retroreflective articles and is used herein to mean ASTM E 810-93b where the observation angle and entrance angle parameters are as provided above. Preferably, $R_A$ of the first segment exceeds 330 $c/l/m^2$, and more preferably exceeds 500 $c/l/m^2$, when tested in accordance with ASTM E 810-93b. While such high degrees of retroreflectivity can be achieved by the first segment, it may be possible in some embodiments, where retroreflectivity is not so critical, to have $R_A$ as low as 30 $c/l/m^2$. Preferably, the first and second segments demonstrate differences of $R_A$ of at least 25 $c/l/m^2$, and more preferably of at least 100 $c/l/m^2$, when tested in accordance with ASTM E 810-93b.

Under daytime lighting conditions, the first segment displays the color of the reflective thin metal layer, typically, grayish or silverish (referred to herein collectively as grayish), and the second segment displays the color of the underlying colored binder layer which, in a preferred embodiment, is fluorescent. In the first segment, the reflective metal layer is opaque and blocks out from view the underlying binder layer. In the second segment, however, the color of the colored binder layer is seen through the microspheres, and thus the second segment displays a color noticeably different from the color of the first segment under daytime lighting conditions. The term "colored binder layer" is used herein to mean the binder layer is colored by some means that allows the second segment (and if present possibly other segments . . . third, fourth, fifth, et cetera) to display a noticeably different color from the first segment under daytime lighting conditions. As the term is used herein, "noticeably different colors" means the attribute of visual perception that can be described by color is recognized by an ordinary observer as being different. Different shades or hues of the same color may be noticeably different colors under this definition. Color contrast between two different segments may be determined by defining the stimulus value Y for each segment and dividing the higher stimulus value by the lower stimulus value to arrive at the color contrast ratio, $C_c$. Thus, for example, $C_c$ is equal to $Y_2/Y_1$, where $Y_1$ represents the stimulus value of the first segment and $Y_2$ represents the stimulus value of the second segment, $Y_2$ in this instance being greater than $Y_1$. The stimulus values Y may be determined in accordance with the procedure outlined in ASTM E 308-90, where the following operating parameters are as set forth below:

Standard illuminant: $D_{65}$ daylight illuminant

Standard observer: CIE (Internation Commissioner of Illumination) 1931 2°

Wavelength interval: 400–700 nanometers at 10 nanometer intervals

Incident light: 0° on sample plane

Viewing: 45° through a ring of 16 fiber optic receptor stations

Area of view: one inch

Port size: one inch

Knowing these parameters, a person of ordinary skill can reproduce this test. "ASTM" E 308-90" is used herein to mean ASTM E 308-90, where the above-noted parameters are as provided above. For a further discussion of the operating parameters see ASTM E 1164-93. In this invention, the color contrast ratio, $C_c$, between the first and second segments is at least 1.01, preferably is at least 1.68, and more preferably is at least 2. In many embodiments of the invention, $C_c$ is in the 2 to 20 range.

The binder layer can be colored by having an effective amount of a dye or pigment incorporated therein. Alternatively, the binder layer may have a colored film or colored fabric embedded in or disposed beneath a clear polymeric matrix to provide a colored binder layer. In daytime lighting conditions, the contrast in color between the first and second segments allows an image or configuration of the first segment to be vividly displayed. In nighttime lighting conditions, the first segment can retroreflect light to a significantly greater extent than the second major segment to make the image of the first segment discernible to a person located near a light source directed at the retroreflective article.

The present invention differs from known retroreflective articles in that individual retroreflective stripes or images are no longer sewn or adhered to an underlying colored substrate as a separate layer. Instead, the retroreflective stripe or image can be "integral" with the colored background segment; that is, the retroreflective stripe (first segment) and the colored segment (second segment) are formed as a unitary construction comprising two distinct segments—not two separate parts subsequently united together as was previously done in making a retroreflective article for use on a garment. This "integral" feature of the invention is advantageous because the retroreflective region of the first segment cannot become delaminated or otherwise separated from the underlying substrate. Further, fewer layers are needed, reducing the garment's overall weight and improving its flexibility. The first and second segments can employ the same, substantially uniform layer of microspheres on the top surface of the retroreflective article. In addition, the second segment of the inventive article is retroreflective, albeit not as retroreflective as the first segment but still having greater retroreflectivity than the non-retroreflective, fluorescent colored portions of the previously known articles described above. In addition, the steps that comprise the method of the invention are relatively simple when compared to prior art methods. Rather than selectively removing portions of a vapor-coated metal with a solvent, the vapor-coated, reflective metal layer is selectively applied to the embedded portions of the microspheres. Prior art methods used a protective layer, a solvent, and even a laser to selectively remove metal. The method of the present invention is very easy to carry out and does not require use of a solvent or any other chemical solution or complex mechanical devices. Further, less metal may be used in making a retroreflective article in accordance with the present invention.

The above and other advantages of the invention are more fully shown and described in the drawings and detailed description of this invention, where like reference numerals are used to represent similar parts. It is to be understood, however, that the description and drawings are for purposes of illustration and should not be read in a manner that would unduly limit the scope of this invention.

BRIEF DESCRIPTION OF THE DRAWINGS

In the drawings.

These figures are idealized and are not drawn to scale.

DETAILED DESCRIPTION OF THE PREFERRED EMBODIMENTS

In describing preferred embodiments of the invention, specific terminology will be used for the sake of clarity. The invention, however, is not intended to be limited to the specific terms so selected, and it is to be understood that each term so selected includes all technical equivalents that operate similarly.

Figure 2:
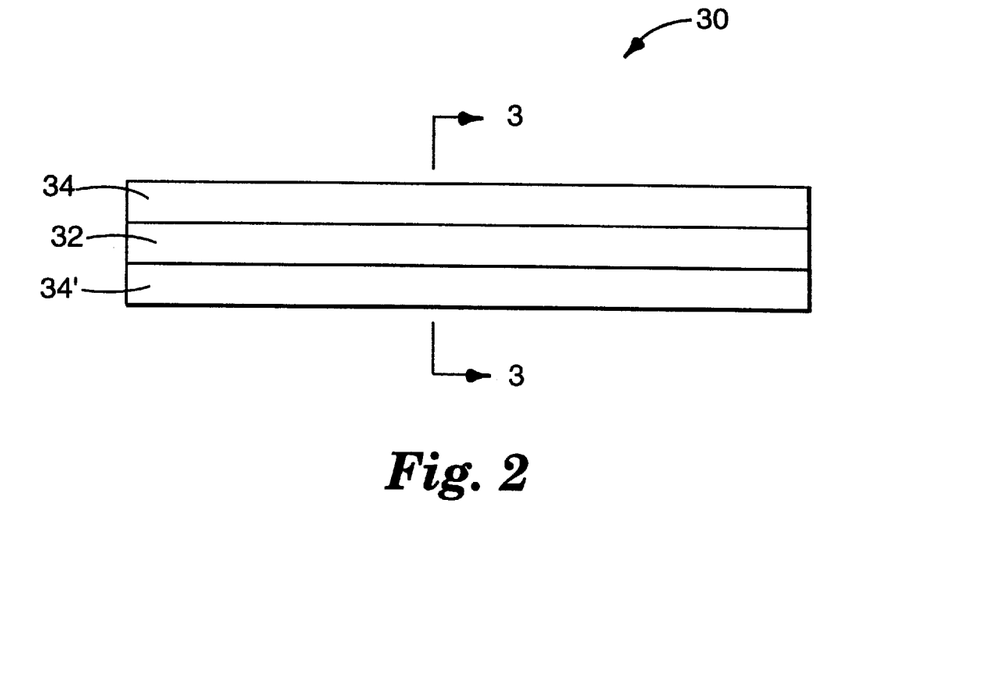
FIG. 2 is front view of a retroreflective article 30 in accordance with the present invention.

In the practice of the present invention, a retroreflective article is provided that has distinct retroreflective segments in an integral construction. In FIG. 2, a retroreflective article 30 of the invention is illustrated which may be used as a safety striping for a fireman's jacket. Article 30 has a first retroreflective segment 32 and second retroreflective segments 34 and 34' disposed on opposite sides of the first segment 32. In daytime lighting conditions, first segment 32 displays a color noticeably different from second major segments 34 and 34'. The first segment 32 displays the color of the underlying reflective metal layer, and the second segments 34, 34' display their intended color which might be, for example, a bright fluorescent orange. The first segment 32 of article 30 can be highly retroreflective, whereas the degree of retroreflection in second segments 34 and 34' can be substantially less.

Figure 3:
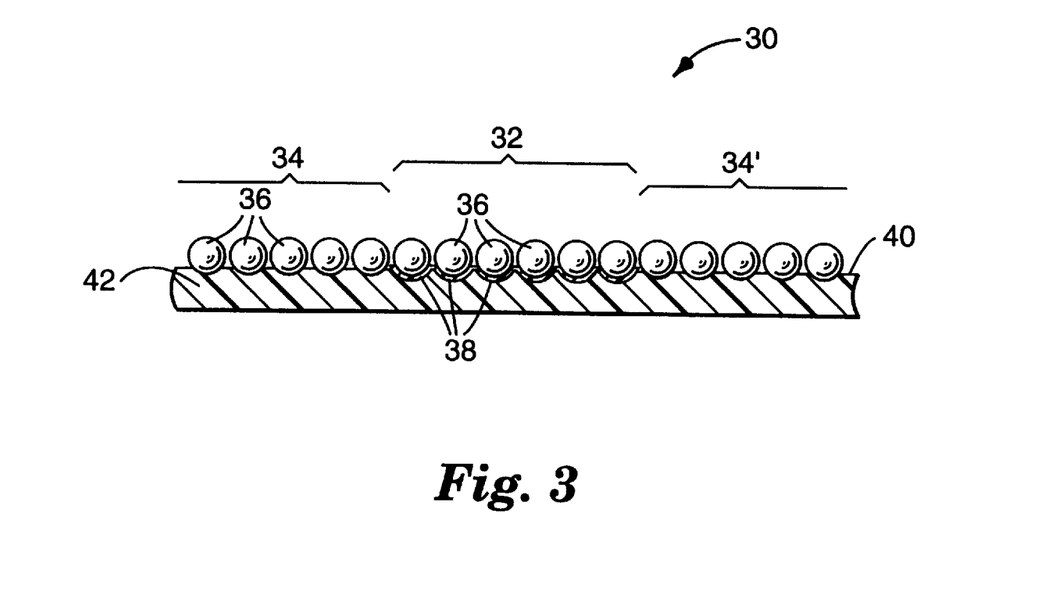
FIG. 3 is a cross-section of a retroreflective article 30 of FIG. 2 taken along line 3—3.

As shown in FIG. 3, the retroreflective article 30 comprises a monolayer of microspheres 36, some of which have a hemispheric reflective metal layer 38 disposed thereon. The microspheres 36 are partially embedded in and partially protruding from the front or first major surface 40 of colored binder layer 42. The microspheres 36 supported by colored binder layer 42 are capable of collimating light so that incident light is returned in a direction substantially parallel to the direction from which the light came. The first segment 32 contains the microspheres 36 that have the metal reflective layer 38 disposed on the embedded portions thereof. The second segments 34 and 34' do not have a reflective metal layer disposed thereon. Without a reflective material located functionally behind the microspheres in the second segment(s), the retroreflectivity of that segment typically is on the order of 5 to 15 c/l/m² when tested in accordance with ASTM E 810-93b; whereas, when a reflective metal layer is disposed on the embedded portion of the layer of microspheres, the first segment typically demonstrates a retroreflectivity on the order of 400 to 600 c/l/m$^2$ when similarly tested. Thus, incident light, which passes through the microspheres 36 to strike reflective metal layer 38, is more strongly retroreflected by segment 32, relative to segments 34 and 34'.

The microspheres used in this invention preferably are substantially spherical in shape in order to provide the most uniform and efficient retroreflection. The microspheres preferably also are substantially transparent so as to minimize absorption of light so that a large percentage of the incident light is retroreflected. Transparent microspheres also allow the color of the underlying binder layer to be better displayed in the segments 34 and 34'. The microspheres often are substantially colorless but may be tinted or colored in some other fashion. The microspheres may be made from glass, a non-vitreous ceramic composition, or a synthetic resin. In general, glass microspheres are preferred because they tend to be less expensive, harder, and more durable than microspheres made from synthetic resins. Examples of microspheres that may be useful in this invention are disclosed in the following U.S. Pat. Nos.: 1,175,224, 2,461,011, 2,726,161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,931,414. The disclosures of these patents are incorporated here by reference.

Microspheres used in the present invention typically have an average diameter in the range of about 30 to 200 micrometers. Microspheres smaller than this range tend to provide lower levels of retroreflection, and microspheres larger than this range may impart an undesirably rough texture to the article or may undesirably reduce its flexibility. Microspheres used in the present invention typically have a refractive index of about 1.7 to about 2.0, the range typically considered to be useful in microsphere-based retroreflective products where the front surfaces of the microspheres are exposed to air. As the term is used herein, an "exposed microsphere retroreflective article" means the microspheres of the retroreflective article are not covered and are exposed to the ambient environment. Although a cover film can be placed over the exposed microspheres to form an enclosed sheeting, it is preferred that the microspheres are exposed because better flexibility, better retroreflective brightness, and better laundering durability are provided by an exposed microsphere reflective article.

As mentioned above, the microspheres used in this invention can have a reflective metal layer disposed on the embedded portions of the microspheres in the first graphic segments to reflect light incident thereupon. The term "reflective metal layer" is used herein to mean a reflective layer comprising an effective amount of elemental metal to reflect incident light, preferably specularly reflect incident light. A variety of metals may be used to provide a specular reflective metal layer. These include aluminum, silver, chromium, nickel, magnesium, gold, and alloys thereof, in elemental form. Aluminum and silver are the preferred metals for use in the reflective layer. The metal may be a continuous coating in the first segment and may be produced by vapor-coating the metal through a mask in accordance with the method of the invention described below. In this form, the reflective metal layer consists essentially of pure metal. There is no need for a resin matrix to support the metal particles. It is to be understood that in the case of aluminum, some of the metal may be in the form of the metal oxide and/or hydroxide. Aluminum and silver metals are preferred because they tend to provide the highest retroreflective brightness. The metal layer should be thick enough to reflect incoming light. Typically, the reflective metal layer is about 50 to 150 nanometers thick. Although the reflective color of a silver coating can be brighter than an aluminum coating, an aluminum layer normally is more preferred because it can provide better laundering durability when adhered to a glass optical element.

The colored binder layer typically contains is a flexible polymeric material that is colored in some fashion. The colored binder layer also may contain such optional additives such as stabilizers (for example, thermal and hydrolytic stabilizers), antioxidants, flame retardants, and flow modifiers (for example, surfactants), viscosity adjusters (for example, organic solvents), rheology modifiers (for example, thickeners), and coalescing agents, plasticizers, tackifiers, and the like. Generally, the colored binder layer contains from about 70 weight percent up to about 99 weight percent of a polymeric material with the remainder being optional additives in effective amounts.

The polymeric material of the colored binder layer may be a polymer including but not limited to an elastomer. For the purposes of the invention, an elastomer is defined as a polymer having an ability to be stretched to at least twice its original length and to retract to approximately its original length when released, (definition taken from "Hawley's Condensed Chemical Dictionary", R. J. Lewis Sr. Ed., 12th Ed., Van Nostrand Reinhold Co., New York, N.Y. (1993)). Preferably, the polymeric substance includes a cross-linked or virtually cross-linked elastomer. A cross-linked elastomer means that the polymeric chains of the elastomer are chemically cross-linked to form a three dimensional network which is stabilized against molecular flow. A virtually cross-linked elastomer means that the polymeric chain mobility of the elastomer is greatly reduced by chain entanglement and/or by hydrogen bonding, resulting in an increase in the cohesive or internal strength of the polymer. Examples of such polymer cross-linking include carbon-carbon bond formation such as: free radical bonding between vinyl groups between chains; agent or group coupling such as by vulcanization or reaction with a coupling agent such as a diol in the case of isocyanate or epoxy functionalized polymers; a diisocyanate or an activated ester in the case of amine and alcohol functionalized polymers; and epoxides and diols in the case of carboxylic acid or anhydride functionalized polymers. Examples of such virtual cross-linking include amide hydrogen bonding as is found in polyamides or crystalline and amorphous region interactions as is found in block copolymers of styrene and acrylonitrile.

Illustrative examples of the polymers that may be employed in the colored binder layer include: polyolefins; polyesters; polyurethanes; polyepoxides; natural and synthetic rubbers; and combinations thereof. Examples of cross-linked polymers include the foregoing examples of polymers substituted with cross-linkable groups such as epoxide groups, olefinic groups, isocyanate groups, alcohol groups, amine groups or anhydride groups. Multifunctional monomers and oligomers which react with functional groups of the polymers may also be used as cross-linkers.

Specific examples of useful binder layer materials are disclosed in U.S. Pat. Nos. 5,200,262 and 5,283,101, the disclosures of which are incorporated here by reference. In the '262 patent, the binder layer comprises one or more flexible polymers having active hydrogen functionalities such as crosslinked urethane-based polymers (for example, isocyanate cured polyesters or one of two component polyurethanes) and one or more isocyanate-functional silane coupling agents. In the '101 patent, the binder layer comprises an electron-beam cured polymer selected from the group consisting of chlorosulfonated polyethylenes, ethylene copolymers comprising at least about 70 weight percent polyethylene, and poly(ethylene-co-propylene-co diene) polymers.

Examples of commercially-available polymers that may be used in the colored binder layer of the invention include the following: Vitel™ VPE 5545 and VPE 5833 polyesters available from Goodyear Tire and Rubber Company, Akron, Ohio; Rhoplex™ HA-8 and NW-1845 acrylic resins available from Rohm and Haas, Philadelphia, Pa.; Cydrothane™ a polyurethane available from Cytec Industries of American Cyanamide, West Patterson, N. J.; Estane™ 5703 and 5715 available from B.F. Goodrich, Cleveland, Ohio; and Nipol™ 1000, available from Zeon Chemicals, Inc., Rolling Meadows, Ill.

The colored binder layer typically has a thickness of about 50 to 250 micrometers (2 to 10 mils), with thicknesses of about 75 to 200 micrometers (3 to 8 mils) often being preferred. It is to be understood that a colored binder layer having a thickness outside these ranges may be used; however, if the binder layer is too thin, it may not provide sufficient support to the microspheres, allowing them to become dislodged. In some embodiments, an adhesive layer (not shown) may be coated over the back or second major surface of the binder layer.

The binder layer preferably is colored by incorporating a dye or pigment therein. Examples of such dyes and pigments that may be used include:

| Company | Company Order Number | Colour Index Name | Colour Index Number |
| --- | --- | --- | --- |
| BASF Corporation, Cliffton, New Jersey | Sudan ™ Yellow 146 | Yellow 16 | 12,700 |
| | Sudan ™ Yellow 150 | Yellow 56 | 11,021 |
| | Sudan ™ Red 290 | Red 1 | 12,150 |
| | Sudan ™ Blue 670 | Blue 35 | 61,554 |
| Sun Chemical Pigments, Sun Chemical, Cincinnati, Ohio | 275-0570 | Pigment Yellow 83 | 21,108 |
| | 275-0023 | Pigment Yellow 17 | 21,105 |

Preferably, the colorant is a highly visible fluorescent dye and/or pigment. Fluorescent dyes and/or pigments can provide enhanced conspicuity under daytime lighting conditions. Examples of fluorescent dyes or pigments that may be used in this invention to color the binder layer, include: Day-Glo™ Fire Orange T-14, Rocket Red GT, Blaze Orange GT, and Saturn Yellow T-17, Day-Glo Color Corp., Cleveland, Ohio; Flare™ 911 Cleveland Pigment & Color Co., Akron, Ohio; Lumogen™ F Red 300, F Yellow 083, and yellow S0790 (Pigment Yellow 101, C.I. No. 48052), BASF Corporation, Cliffton, N.J.

Figure 4:
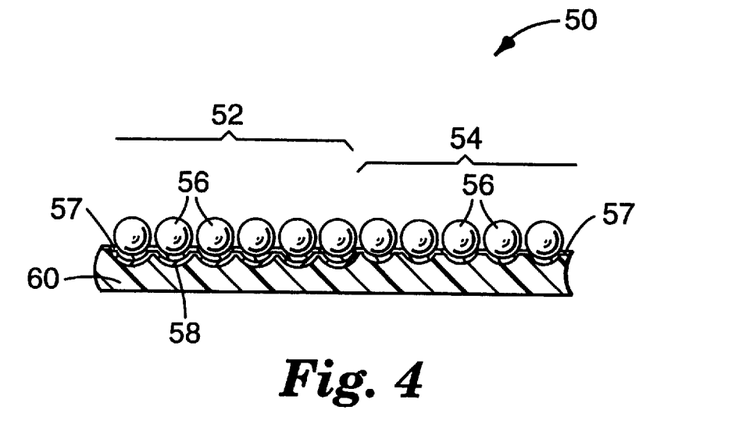
FIG. 4 is a cross-section of an alternative embodiment of a retroreflective article 50 in accordance with the present invention.

In an alternative embodiment of the invention, the segment(s) which appear colored under daytime lighting conditions can be designed to provide retroreflectivity that is enhanced relative to the embodiment illustrated in FIG. 3. Referring to FIG. 4, a retroreflective article 50 is shown which provides enhanced retroreflectivity in the colored segments of the article 50. Article 50 is similar to article 30 (FIG. 3) in having a first segment 52, which can be highly retroreflective and can be grayish in appearance under strong diffuse ambient light, and in having a second major segment 54 which exhibits a different degree of retroreflectivity relative to the first segment and which displays the color of the binder layer 60 under daytime lighting conditions.

Article 50 comprises a monolayer of transparent microspheres 56, a multilayer dielectric mirror 57 forming hemispheric reflectors over the microspheres in segments 52 and 54, a reflective metal layer 58 forming hemispheric reflectors over the dielectric mirror 57 in segment 52, and a binder layer 60 extending over segments 52 and 54 into which the reflective layers 57 and 58 are partially embedded.

Although the dielectric mirror is shown to extend into segment 52, this is not necessary for this embodiment of the invention; the embodiment is illustrated this way because it is merely expedient to manufacture the article in this fashion. It is preferred, however, that the dielectric mirror 57 not be disposed between the reflective metal layer 58 and microspheres 56 because improved laundering durability can be provided when the reflective metal layer is disposed directly on the microspheres, particularly when the microspheres are glass and the reflective metal layer is aluminum. Accordingly, the article in FIG. 4 may be made by selectively applying the reflective metal layer to the microspheres before the dielectric mirror is applied so that the reflective metal layer directly contacts the microspheres.

The dielectric mirror 57 may be similar to known dielectric mirrors disclosed in U.S. Pat. Nos. 3,700,305 and 4,763,985 to Bingham. The disclosures of these patents are incorporated here by reference. In using dielectric mirrors, the microspheres typically have a refractive index $n_2$ and have a layer of transparent material disposed thereon which has a refractive index $n_1$. The opposite face of the transparent material having refractive index $n_1$, is in contact with a material having a refractive index $n_3$. Both $n_2$ and $n_3$ have a refractive index of at least 0.1, preferably at least 0.3, higher or lower than $n_1$. The transparent material is a layer typically having an optical thickness corresponding to odd numbered multiples (that is, 1, 3, 5, 7 . . . ) of about one-quarter wavelength of light in the wavelength range of about 380 to about 1,000 nanometers. Thus, either $n_2 > n_1 < n_3$ or $n_2 < n_1 > n_3$, and the materials on either side of the transparent layer may be either both higher or both lower in refractive index than $n_1$. When $n_1$, is higher than both $n_2$ and $n_3$, $n_1$ is preferably in the 1.7 to 4.9 range, and $n_2$ and $n_3$ are preferably in the 1.2 to 1.7 range. Conversely, when $n_1$ is lower than both $n_2$ and $n_3$, $n_1$ is preferably in the 1.2 to 1.7 range, and $n_2$ and $n_3$ are preferably in the 1.7 to 4.9 range. The dielectric mirror preferably comprises a contiguous array of materials, at least one being in layer form, having an alternating sequence of refractive indices. In a preferred embodiment the contiguous array has from two to seven layers, preferably three to five layers, adjacent to the spherical lens element. Desirably all are light transparent materials and are clear or essentially colorless to minimize light absorption and maximize display of the colored binder layer.

Among the many compounds that may be used in providing transparent materials within the desired refractive index range are: high index materials such as CdS, $CeO_2$, CsI, GaAs, Ge, InAs, InP, InSb, $ZrO_2$, $Bi_2O_3$, ZnSe, ZnS, $WO_3$, PbS, PbSe, PbTe, RbI, Si, $Ta_2O_5$, Te, $TiO_2$; low index materials such as $Al_2O_3$, $AlF_3$, $CaF_2$, $CeF_3$, LiF, $MgF_2$, NaCle, $Na_3AlF_6$, $ThOf_2$, elastomeric copolymers of perfluoropropylene and vinylidene fluoride (refractive index of ≈1.38), et cetera. Other materials are reported in *Thin Film Phenomena*, K. L. Chopra, page 750, McGraw-Hill Book Company, New York, (1969). Preferred succeeding layers contain cryolite ($Na_3AlF_6$) and zinc sulfide.

A dielectric mirror can provide very good retroreflectivity; although, it typically is not as efficient a reflector as a reflective metal layer. When a dielectric mirror contains one layer, it typically allows the article to demonstrate a retroreflectivity, $R_A$, of 50 to 100 c/l/m² in the segment where the mirror is present when tested in accordance with ASTM E 810-93b. When two layers are present, the segment typically demonstrates a retroreflectivity, $R_A$, of approximately 100 to 300 c/l/m² when tested in accordance with ASTM E 810-93b. If four layers are used, the retroreflectivity, $R_A$, can be as high as 300 to 500 c/l/m².

Figure 5:
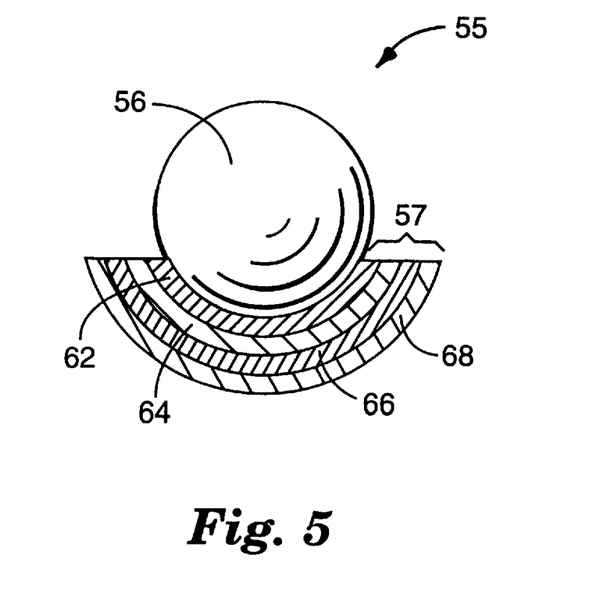
FIG. 5 is a partial cross-section of a single retroreflective element 55 used in the embodiment illustrated in FIG. 4.

An example of a dielectric mirror 57, is shown in an expanded view in FIG. 5 for a single retroreflective element 55 comprising a glass microsphere 56 ($n^2 \cong 1.94$) from segment 54 of article 50. Dielectric mirror 57 can consist essentially of alternating layers of, for example, cryolite 62, 66 ($n_1 \cong 1.38$) and zinc sulfide 64, 68 ($n_3 \cong 2.35$). Dielectric mirror 57 can be designed to provide a significant level of retroreflectivity while allowing sufficient light transmission therethrough for the colorant in binder layer 60 to be readily observed from the front side of the article in daytime lighting conditions.

Figure 6:
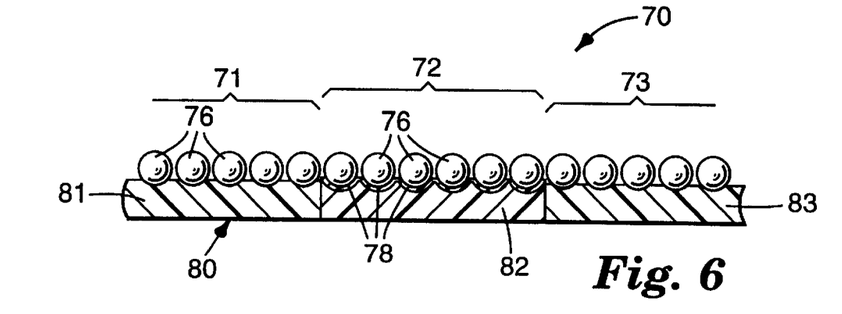
FIG. 6 is a cross-section of another embodiment of a retroreflective article 70 in accordance with the present invention.

In FIG. 6, another embodiment 70 of the invention is shown which has three separate segments 71, 72, and 73, each presenting different appearances to an observer, particularly under daytime lighting conditions. In this embodiment, a monolayer of microspheres 76 extends over a colored binder layer 80 that contains three binder layer segments 81, 82, and 83. The microspheres 76 embedded in binder layer segment 82 have a reflective metal layer 78 on the embedded portions of the microspheres 76. Each of the binder layers segments 81, 82, and 83, in segments 71, 72, and 73, respectively, may comprise different colorants such that segments 71 and 73 can have a different appearance from each other and from segment 72 under daytime lighting conditions. For example, segment 71 can display a fluorescent orange color while segment 73 displays a fluorescent yellow color. Binder layer segment 82 optionally may be formulated with a colorant selected to blend with or match the color of the metal reflective layer 78 to mask any loss of microspheres 76 which may result from scratching the front surface of article 70 against furniture, walls, or any other object or surface. When a microsphere becomes displaced from the sheeting, a portion of the reflective metal layer directly beneath the microsphere 76 usually also will be removed from the sheeting. If the color of the binder layer segment 82 does not match the color of the reflective metal layer 78, the loss of the microsphere becomes noticeable. Thus, binder layer segment 82 preferably is colored to match the metal reflective layer 78.

In another embodiment, a dielectric mirror can be used as the reflective material for the embodiment illustrated in FIG. 6. When a dielectric mirror is used as the reflective layer, the color of the underlying binder layer 82 will be displayed to an observer on the front side of article 70 because dielectric mirrors tend to be transparent. Thus, displaced microspheres are not very noticeable when a dielectric mirror is used as the reflective layer. The underlying binder layer 82 can be colored gray if it is desired to make segment 72 resemble an article that employs an aluminum or silver reflective metal layer when viewed from the front side under daytime viewing conditions. A dielectric mirror can provide a "high degree of retroreflectivity", as that term has been defined above; however, metal reflective layers are the preferred reflectors because they provide more efficient retroreflectivity and better laundering durability. The dielectric mirror may be applied to the backside of the microspheres by known techniques, for example, vapor coating. A mask may be used (see infra) to selectively apply the dielectric mirror to the microspheres in the first segment. The mask has portions that are impermeable to the molecules or particles that comprise the dielectric mirror so that the dielectric material is not deposited on the second (third, . . . ) segment(s).

To provide extraordinary laundering durability, a reflective metal layer, particularly in a reflective aluminum layer, is used in conjunction with the binder material disclosed in U.S. Pat. No. 5,200,262 in binder layer segment 82. Segment 82 therefore preferably comprises a polymeric material having active hydrogen functionalities and one or more isocyanate-functional silane coupling agents (for example, gammaisocyanatopropyltriethoxy-silane). Preferably, the binder layer segment disposed beneath the reflective metal layer contains at least one of the following polymers: polyisocyanate-cured polyester; a one component polyurethane; or a two component polyurethane.

Illustrative examples of suitable binder materials include isocyanate-curable polyesters such as copolyester resins in the Vitel™ series of Goodyear Tire and Rubber Company and polyester resins sold by Bostik Corporation, Middleton, Mass. Other examples of suitable binder materials include such polyols as polytetramethylene oxide glycol, polyester polyol, hydroxy-terminated polybutadiene, polycaprolactone polyol, polybutylene oxide glycol, and polypropylene oxide glycol. Other illustrative examples include the aliphatic and aromatic polyisocyanates sold in the Desmodur™ and Mondur™ series by Miles Industrial Chemicals, Pittsburgh, Pa.

An illustrative example of a preferred binder layer composition for use in segment 82, comprises:

| Parts | Component |
| --- | --- |
| 100 | Binder Material - 50 weight percent solids solution in methyl ethyl ketone/toluene (1:1 weight ratio) of Vitel ™ VPE-5545, a linear saturated polyester from Goodyear |
| 2.4 | Binder Material - Mondur ™ CB75, a 75 weight percent solids solution in ethyl acetate of an aromatic polyisocyanate based on adduct of toluene diisocyanate, from Miles Industrial Chemicals |
| 2.0 | Coupling Agent - Union Carbide ™ A-1310, a gamma-isocyanatopropyltriethoxysilane |
| 0.2 | Catalyst - dibutyltindilaurate |

Preferably, binder layer segment 82 contains 0.1 to 10 weight percent, more preferably 0.5 to 4 weight percent, of the isocyanate-functional silane coupling agent.

In other embodiments of the invention, selective areas of the reflective metal layers may possess substantially latent images in the form of a logo, number, word, or other indicia, which are not readily observed in daytime lighting conditions but are highly visible in nighttime lighting conditions when a beam of light is directed at a certain angle towards the retroreflective article. These images in the highly retroreflective segments 52, 62, 72 (FIGS. 2, 3, 4, and 6) can be produced by selective laser ablation of portions of the metallic layer, as described in U.S. Pat. Nos. 4,634,220, 4,645,301, 4,650,283, 4,688,894, 4,691,993, 4,708,920, and 4,714,656, the disclosures of which are incorporated here by reference. In segments that possess dielectric mirrors, the latent images may be produced by modifying the arrangement of the layers in the dielectric mirrors to affect the efficiency of retroreflection, as described in U.S. Pat. No. 3,801,183, the disclosure of which is incorporated here by reference.

Figure 7:
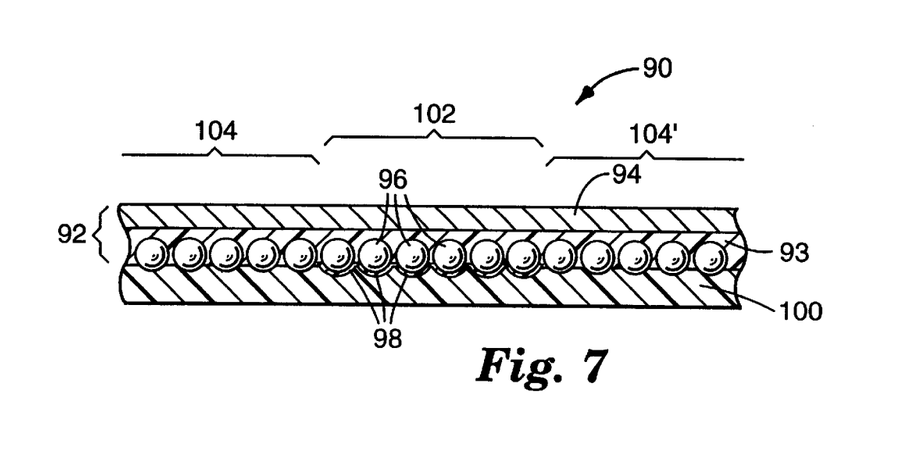
FIG. 7 illustrates an article 90 used in forming a retroreflective article in accordance with the present invention.

A retroreflective article of the invention can be made by first forming article 90 shown in FIG. 7. In forming article 90, a monolayer of microspheres 96 is first made by partially embedding microspheres 96 onto a carrier web 92. Carrier web 92 secures microspheres 96 thereon in a desired temporary arrangement. Microspheres 96 preferably are packed as closely as possible on carrier web 92, and may be so arranged by any convenient process, such as printing, screening, cascading, or with a hot can roll. Carrier web 92 can include a heat softenable polymer layer 93 on paper sheet 94. Examples of useful polymer layers 93 for carrier 92 include: polyvinyl chloride; polyolefins such as polyethylene, polypropylene, and polybutylene; and polyesters; et cetera. For a further discussion of applying microspheres to the carrier web, see U.S. Pat. Nos. 4,763,985, 5,128,804, and 5,200,262, the disclosures of which are incorporated here by reference.

Upon cooling, polymer layer 93 retains microspheres 96 in the desired arrangement. Depending in part on the characteristics of the carrier web 92 and microspheres 96, it may be desired to condition carrier 92 and/or microspheres 96 by applying selected release agents or adhesion promoters to achieve desired carrier release properties.

The metal reflective layer 98 is then selectively applied to the carrier web 92 on the side where the exposed portions of the microspheres 96 protrude to form retroreflective segment 102. The surface area of the reflective metal layer 98 on each microsphere 96 may be controlled in part by controlling the depth to which the microspheres 96 are embedded in the carrier prior to application of the metal reflective layer 98.

Metal reflective layer 98 can be selectively applied according to the method of the invention by vapor-coating a reflective metal through a mask (not shown). The mask prevents the metal from coming into contact with retroreflective segments 104 and 104' and therefore eliminates any need to remove metal from those segments. As indicated above, in prior art methods, the metal was vapor-coated over the whole surface of the microspheres, the metal was protected in certain areas, and then the metal was subsequently removed in the unprotected areas by a chemical etching technique. Using the vapor-coating in conjunction with a mask, a substantially less cumbersome and less complicated method is provided for selectively placing reflective metal behind the embedded portions of microspheres.

The mask employed in the method of the present invention is configured as a negative image of the first segment on the resulting retroreflective article. The mask has metal-molecule-impermeable-surfaces that define openings through which the metal passes during the vapor-coating process. The metal that passes through the openings becomes secured directly or indirectly to the portions of the microspheres that protrude from the carrier web. Although FIG. 7 does not so illustrate, in accordance with the method of the invention, the reflective metal layer need not be disposed directly on the microspheres. A space coat layer, for example, may be disposed between the reflective metal layer and the microspheres. It is only necessary that the metal layer be disposed functionally behind the microspheres.

The openings in the mask may resemble a stripe or any other form of indicia that is desired to be displayed by the retroreflective article of the invention. For example, if the article illustrated in FIGS. 2 and 3 is intended to be made, the mask would have a central elongated opening resembling segment 32 bounded on both sides by surfaces impermeable to vaporized metal.

The vapor-coating operation may be achieved by placing a metal in an evaporator which is heated in a vacuum to a temperature high enough to vaporize the metal. Usually the vacuum pressure is about 0.133 to 1.33 pascals. Sputtering techniques also may be used to create a stream or cloud of metal molecules or particles in a vacuum. As the term is used herein, "vapor-coating" means creating a stream of metal molecules or particles in a vacuum by techniques including, but not limited to, evaporating and sputtering. The molecules or particles created by vapor coating subsequently are adhered to the backside of the microspheres.

After the metal has been vapor-coated onto segment 102, the binder layer 100 can be formed over the protruding microspheres to produce article 90 illustrated in FIG. 7. The binder layer 100 can be formed on the microspheres 96 by known methods, such as solution coating, film extrusion, and melt blown fiber deposition.

After producing article 90, the temporary carrier 92 may be removed from article 90 to provide a retroreflective article in accordance with the present invention. When removing the carrier 92, the microspheres remain embedded in binder layer 100 and thus a retroreflective article resembling article 30 of FIG. 3 is provided. Before removal of the carrier, the binder layer 100 is attached to a substrate such as a fabric or the outer surface of an article of clothing. Securement of the binder layer to another substrate prevents damaging the retroreflective article when the carrier is removed therefrom.

Articles having the configuration illustrated in FIG. 2 may be made in a bulk quantities using a continuous or batch process. To make the articles in bulk, a large carrier web, for example, 30 cm wide by 50 m in length can be used to temporarily support a monolayer of microspheres. In a continuous process, the web desirably comes off a roll. A mask of at least a similar width having a multitude of elongated openings, for example, 1 cm in width, that define the size of the stripes of the first segment, is then placed over the monolayer of microspheres. The reflective metal layer can be vapor-coated through the openings onto the supported microspheres to provide a series of stripes on the protruding portions of the microspheres. The mask is removed, and a colored binder layer is deposited over on the protruding portions of the microspheres. The resulting article has on the front side a series of alternating stripes, displaying the color of the reflective metal layer and the color of the binder layer. The stripes that display the reflective metal layer are 1 cm in width, and the stripes that display the color of the binder layer are 2 cm in width. This article then can be cut parallel to the vapor-coated stripes midway therebetween (1 cm) to provide a series of retroreflective articles 3 cm in width that resemble article 30 shown in FIG. 2 after removal of the carrier web.

In making striped articles in this fashion, the stripes of the first segment generally are from 1 to 10 cm in width, preferably from 2 to 4 cm. The whole article including the second or colored segments generally is from 2 to 30 cm in width, more preferably from 4 to 12 cm in width. Although the resulting article generally has one metal-colored stripe, it is within the scope of this invention to provide two or more metal-coated, retroreflective segments per article. For example, the resulting article can be cut in the middle of the vapor-coated stripe to provide an article that has a second or colored segment bounded on both sides by a first segment that displays the color of the underlying reflective metal layer. When an article resembling the structure of FIG. 6 is desired to be produced, at least two different binder layer compositions can be coextruded through three different dies to provide three segments of the desired width. When the articles are made in bulk, they may be made on webs that are greater than 20 cm in width, preferably greater than 30 cm in width, before being cut into individual striped articles.

Retroreflective articles of the invention may be applied to a substrate using a variety of methods. In one method, the article's binder layer is heat laminated directly to the underlying substrate. Alternatively, the retroreflective article may be mechanically secured to the substrate by, for example, sewing. In some applications, however, it is desired to secure the article to the substrate by use of an adhesive layer disposed on the back or second surface of the binder layer. The adhesive layer may be a pressure-sensitive adhesive, a heat-activated adhesive, or an ultraviolet-radiation-activated adhesive. A fire retardant material, such as a brominated biphenol (for example, decabromodiphenyl oxide, Saytex™ 102E, Ethyl Corporation, Baton Rouge, La.), can be placed in the adhesive.

The substrate to which the retroreflective article may be applied can be any substrate to which the article can be secured. Often the substrate is, or becomes, the outer surface of an article of clothing—so that the retroreflective article is displayed when the clothing is worn in its normal orientation on a person. The substrate may be, for example: a woven or nonwoven fabric such as a cotton fabric; a polymeric layer including nylons, olefins, polyesters, cellulosics, urethanes, vinyls, acrylics, rubbers; leather; and the like. One preferred substrate for use in the invention is a polyester nylon tricot knitted fabric treated with a fire retardant material. The substrate also could be rigid, metal surface such as the body of a motor vehicle, the walls of a truck trailer, or the surface of a helmet. The retroreflective article of the invention, however, is particularly advantageous when displayed on clothing because a highly retroreflective segment (that is, the segment containing the metal reflective layer) is integral with the article and therefore cannot become delaminated during laundering or any other similarly rigorous process.

Figure 8:
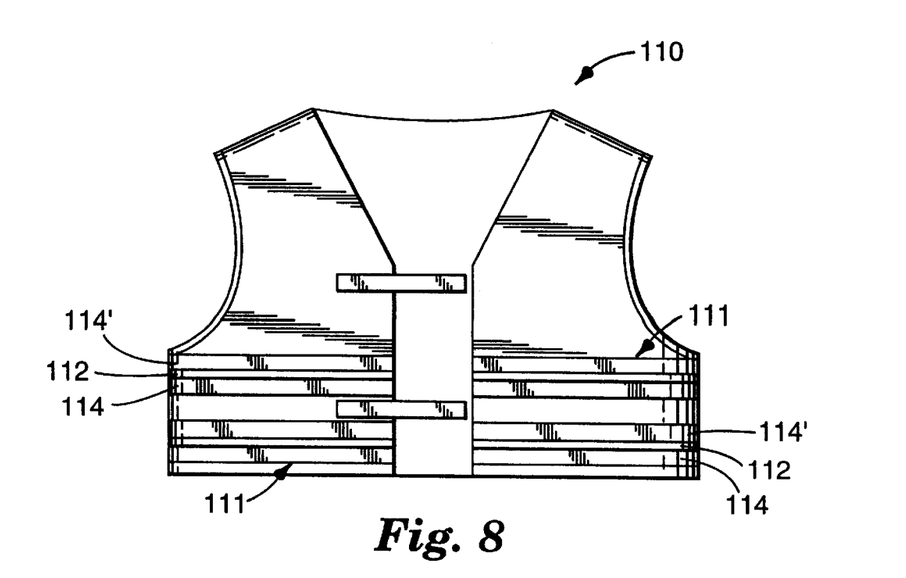
FIG. 8 illustrates an article of clothing 110 displaying retroreflective articles 111 of the present invention.

FIG. 8 illustrates an example of an article of clothing, a safety vest 110, displaying a retroreflective article 111, having a highly retroreflective segment 112 bounded on both sides by colored segments 114 and 114'. Although a safety vest 110 has been chosen for illustration, the article of clothing of the invention may be (and is defined herein to be) essentially any item of launderable wearing apparel sized and configured to be worn or carried by a person and displaying a retroreflective article on the outer surface thereon. Other examples of articles of clothing that may display retroreflective articles according to the invention include shirts, sweaters, jackets, coats, pants, shoes, socks, gloves, belts, hats, suits, one-piece body garment, bags, backpacks, helmets, et cetera.

The following Examples have been selected merely to further illustrate features, advantages, and other details of the invention. It is to be expressly understood, however, that while the Examples serve this purpose, the particular ingredients and amounts used as well as other conditions and details are not to be construed in a manner that would unduly limit the scope of this invention.

EXAMPLES

Example 1

A 30 cm wide carrier web comprising a paper sheet coated with a heat-softenable layer of polyethylene having a coextensive monolayer of transparent glass microspheres partially and temporarily embedded into the surface of the polyethylene by heating the carrier to 100 to 140° C. and cascading the microspheres onto the heated web. The protruding portions of the partially embedded microspheres were vapor-coated with aluminum through a mask having openings that provided a series of four parallel, 1.9 cm wide, metal stripes along the length of the web, separated by a non-coated region 5 cm in width. The entire surface, including the vapor-coated aluminum stripes and the non-coated regions, was then coated with a layer (0.23 millimeters (mm) or 9 mil, wet coating thickness) of a fluorescent binder solution consisting essentially of:

| Component | Parts by Weight |
|---|---|
| Methyl Isobutyl Ketone | 13.6 |
| Dayglo ™ T14, Fire Orange Fluorescent Pigment | 5.4 |
| Dayglo ™ GT15, Orange Blaze Fluorescent Pigment | 8.1 |
| Methyl Ethyl Ketone | 15.3 |
| Toluene | 15.7 |
| Vitel ™ - VPE 5545 | 31.6 |
| Vitel ™ - VPE 5843 | 3.3 |
| Z-6040 (a silane) Dow Chemical, Midland, Michigan | 2.0 |
| Mondur ™ CB-75 | 5.0 |

The binder layer was then over-coated with an adhesive layer (0.23 mm or 9 mil, wet coating thickness) containing:

| Component | Parts by Weight |
|---|---|
| Methyl Ethyl Ketone | 20.8 |
| Diacetone Alcohol | 28.2 |
| Saytex ™ 102E, Flame Retardant | 7.1 |
| Estane ™ 5703 | 14.3 |
| Antimony Oxide | 4.3 |
| Titanium Oxide | 23.3 |
| Mondur ™ CB-75 | 2.0 |

A flame-resistant tricot fabric was then laminated to the adhesive layer of the above-described retroreflective sheeting. The carrier layer then was stripped away, exposing the previously embedded surfaces of the monolayer of glass microspheres.

The retroreflective sheeting then was slit into 6.9 cm wide retroreflective stripes, resembling the embodiment illustrated in FIGS. 2 and 3.

Example 2

A 30 cm wide carrier web comprising a paper sheet coated with a heat-softenable layer of polyethylene had a coextensive monolayer of transparent glass microspheres partially embedded into the surface of the polyethylene by heating the carrier to 100 to 140° C. and cascading the microspheres onto the heated web. The protruding portions of the glass microspheres were successively vapor-coated with a series of thin layers of dielectric material having differing refractive indices, as taught in Bingham, U.S. Pat. No. 3,700,305. The first vapor-coated dielectric layer applied to the surface of the glass microspheres layer was cryolite ($Na_3AlF_6$) with a refractive index in the range 1.35–1.39. The second vapor-coated dielectric layer was zinc sulfide (ZnS) with a refractive index of approximately 2.35. Both dielectric layers were in the thickness range 135–140 nanometers (nm), corresponding to about one-fourth of the wavelength of light in the center of the visible light spectrum. The zinc sulfide coated surface then was vapor-coated with aluminum through a mask to provide a series of 2.9 cm wide stripes along the length of the web, separated by a non-coated region 5 cm in width. The entire surface, including the vapor-coated aluminum stripes and the intervening non-coated regions where the zinc sulfide layer was still exposed, was then coated with a fluorescent binder solution containing:

| Component | Parts by Weight |
|---|---|
| Methyl Isobutyl Ketone | 13.6 |
| Dayglo T14, Fire Orange Fluorescent Pigment | 5.4 |
| Dayglo GT15, Orange Blaze Fluoreseent Pigment | 8.1 |
| Methyl Ethyl Ketone | 15.3 |
| Toluene | 15.7 |
| Vitel ™ VPE 5545 | 31.6 |
| Vitel ™ VPE 5843 | 3.3 |
| Z-6040 Silane | 2.0 |
| Mondur ™ CB-75 | 5.0 |

A flame-resistant tricot fabric was then coated with an adhesive (225 micrometers, wet coating thickness) containing:

| Component | Parts by Weight |
|---|---|
| Methyl Ethyl Ketone | 20.8 |
| Diacetone Alcohol | 28.2 |
| Flame Retardant (Saytex 102E) | 7.1 |
| Estane 5703 | 14.3 |
| Antimony Oxide | 4.3 |
| Titanium Oxide | 23.3 |
| Mondur ™ CB-75 Isocyanate | 2.0 |

The adhesive coated fabric then was laminated to the binder layer of the aforementioned sheeting with the adhesive being disposed on the side opposite the microspheres. The carrier was stripped away, exposing the previously embedded surfaces of the monolayer of glass microspheres.

The resulting retroreflective sheeting then was available for slitting and trimming strips of the desired width and length, for subsequent attachment to articles of clothing.

Example 3

This example illustrates how a striped retroreflective sheeting is made which has three binder layer segments as shown in FIG. 6.

A carrier web having a monolayer of microspheres embedded therein was vapor-coated with aluminum as described in Example 2. The solutions that form the binder layer were coated through a dual layer extrusion coating die. Each half of the extrusion coating die was masked by placing shims inside the body of the die cavity which caused the solution to be coated in well defined stripes. The shims of the two cavities were positives and negatives of the other cavity so that the resulting combination of the two coatings together produced a continuous coating which consisted of alternating colors. The shims were constructed so that there was no overlap of colors nor a gap between the two colors. The shims were also constructed so that the coatings would correspond to the stripes in the vapor coat. One of the dies coated a gray binder solution directly on top of the aluminum vapor coat, and the other die coated a fluorescent yellow binder solution where there was no vapor coat deposit. These solutions were coated at 175 micrometers thick, and then were dried. The gray binder solution had the following composition:

| Component | Parts by Weight |
|---|---|
| Vitel ™ VPE 5545 | 46.67 |
| Methyl Ethyl Ketone | 29.77 |
| Toluene | 23.33 |
| Zapon Black dye, BASF, Cliffton, New Jersey | 0.047 |
| Dibutyl Tindilaurate | 0.186 |
| A-1310 Silane² | 2.0 |
| Mondur ™ CB-75 | 4.72 |

The fluorescent yellow binder solution had the following composition:

| Component | Parts by Weight |
|---|---|
| Methyl Isobutyl Ketone | 9.5 |
| Methyl Ethyl Ketone | 19.3 |
| Toluene | 19.3 |
| Vitel ™ VPE 5545 | 38.6 |
| Vitel ™ VPE 5833 | 3.8 |
| Z-6040 Silane | 2.0 |
| Mondur ™ CB-75 | 5.0 |

This striped coating layer was then over-coated with a 225 micrometer wet adhesive layer containing:

| Component | Parts by Weight |
|---|---|
| Methyl Ethyl Ketone | 20.8 |
| Diacetone alcohol | 28.2 |
| Saytex ™ 102E | 7.1 |
| Estane ™ 5703 | 14.3 |
| Antimony Oxide | 4.3 |
| Titanium Oxide | 23.3 |
| Mondur ™ CB-75 | 2.0 |

A flame resistant tricot then was laminated to the adhesive layer. The carrier was then stripped away, exposing the previously embedded surfaces of the monolayer of glass microspheres. The sheeting was then slit into 6.9 cm wide strips, having a cross-section resembling the embodiment of FIG. 6.

Various modifications and alterations of this invention will become apparent to those skilled in the art without departing from the scope and spirit of this invention. Accordingly, it is to be understood that this invention is not to be limited to the above-described, but is to be controlled by the limitations set forth in the following claims and any equivalents thereof.

What is claimed is:

1. A method of making a retroreflective article, which comprises:
   (a) supporting a layer of microspheres on a carrier;
   (b) vapor coating a reflective metal layer selectively to the supported layer of microspheres such that a first portion of the layer of microspheres has the reflective metal layer coated functionally therebehind and a second portion does not;
   (c) partially embedding the layer of microspheres in a first major surface of a colored binder layer; and
   (d) separating the carrier from the layer of microspheres such that the layer of microspheres remains partially embedded in the first major surface of the colored binder layer to form a retroreflective article having first and second segments, wherein the first segment has the vapor-coated reflective metal layer disposed functionally behind the embedded portion of the microspheres and wherein the first and second segments display noticeably different colors when viewed under daytime lighting conditions.

2. The method of claim 1, wherein the metal reflective layer is selectively applied by vapor-coating the reflective metal through a mask.

3. The method of claim 2, wherein the mask has a metal molecule impermeable surface that defines openings through which the metal vapor passes during the vapor-coating step.

4. The method of claim 3, wherein the metal that passes through the openings becomes secured directly to the microspheres on the first portion.

5. The method of claim 3, wherein the openings in the mask are in the form of a stripe.

6. The method of claim 5, wherein the mask includes a plurality of stripes that are 1 to 10 centimeters in width.

7. The method of claim 6, wherein the stripes are 2 to 4 centimeters in width.

8. The method of claim 6, wherein the binder layer is 2 to 30 centimeters in width.

9. The method of claim 8, further comprising cutting the binder layer to provide a plurality of retroreflective articles that each possess a first segment that is in the form of a stripe.

10. The method of claim 1, wherein the first and second binder layer segments each containing different polymeric compositions.

11. The method of claim 10, wherein the layer of microspheres is partially embedded in the first and second binder layer segment compositions by coextruding the first and second binder layer segment compositions through two different dies to provide the first and second binder layer segments into which the layer of microspheres are embedded.

12. The method of claim 1, wherein the retroreflective article has two second segments that display the same color when viewed under daytime lighting conditions, the first segment being disposed as a stripe between the two second segments.

* * * * *

UNITED STATES PATENT AND TRADEMARK OFFICE
CERTIFICATE OF CORRECTION

PATENT NO. : 6,153,128
DATED : November 28, 2000
INVENTOR(S) : Vera L Lightle et al.

Page 1 of 1

It is certified that error appears in the above-identified patent and that said Letters Patent is hereby corrected as shown below:

Column 8:
Line 8, after "contains" please delete "is".

Column 14:
Line 24, please delete "a" before "bulk".

Column 17:
Line 7, "Floureseent" should read as "Flourescent".

Signed and Sealed this

Nineteenth Day of June, 2001

*Attest:*

NICHOLAS P. GODICI
*Attesting Officer*   Acting Director of the United States Patent and Trademark Office